Patented Jan. 9, 1951

2,537,218

UNITED STATES PATENT OFFICE 2,537,218

REFRACTORY CONCRETE AND METHOD OF MAKING

Roy T. Giles, Daytona Beach, Fla.

No Drawing. Application September 9, 1947, Serial No. 773,077

6 Claims. (Cl. 106—64)

This invention relates to an improved refractory, more particularly a refractory concrete of which an essential component is calcium aluminate cement.

Among the objects of the invention is the provision of an improved refractory composition yielding articles such as refractory structures and shapes of improved strength at elevated temperatures, and the refractory shapes resulting from such composition.

The present invention relates to the same general type of refractory concrete which is disclosed and claimed in Kocher Patent No. 2,416,700. The refractory concrete of the present invention contains as essential components calcium aluminate cement and a refractory material, either the refractory material or the calcium aluminate cement containing at least 1% by weight of hydrogen fluoride, herein designated by its symbol, HF. Preferably, when the HF is contained in the refractory material such material is a granulated or comminuted calcined refractory material initially containing, before calcination, a substantial quantity of combined water, and after calcination being composed to a major degree of alumina, and containing from 1 to as high as about 25% by weight of hydrofluoric acid adsorbed or occluded therein, such material being referred to hereinafter as "HF containing calcined aluminous material." It is possible, however, to incorporate the HF in fire clay grog, which may be employed both as the HF bearing component of the mix and as the refractory aggregate therein.

It is also possible to incorporate the HF in the calcium aluminate cement itself. Thus the mix for forming the refractory concrete of the invention may consist essentially of a two component system, calcium aluminate cement and refractory material, either one of which bears the requisite amount of HF, or a three component system, calcium aluminate cement, refractory material bearing the requisite amount of HF, and refractory aggregate or filler. The refractory concrete of the present invention, which may be employed for the same applications as those outlined in the above Kocher patent, is made from a mix, the constituents of which, in the case of the two-component system, lie within the following limits given in per cent by weight of the total weight of the mix:

|  | Per cent |
|---|---|
| Calcium aluminate cement | 5–60 |
| Refractory material | 95–40 | either one of such components containing at least 1% by weight of HF.

In the three-component system referred to above the mix lies within the following limits given in per cent by weight of the total weight of the mix:

|  | Per cent |
|---|---|
| Calcium aluminate cement | 5–60 |
| Refractory filler | 0–94.5 |
| HF containing calcined aluminous material | .5–95 |

The calcium aluminate cement employed is one which is known in the United States as "Lumnite" cement. Such cement is also referred to as high alumina, alumina, or fused cement.

Considering the embodiment of the invention first above given, by "HF containing calcined aluminous material" as used in the specification and claims, is meant a calcined material composed in at least its major portion of $Al_2O_3$ and which contains, by being adsorbed or occluded therein, HF from a minimum of 1% by weight to the maximum which it is possible for such aluminous material to adsorb or occlude. Within such term is included calcined high-alumina clays containing HF as above, and composed of at least 50% by weight $Al_2O_3$ and having had initially present, before calcination, a substantial quantity of combined water. The calcination is carried out at such a temperature and for such a time that substantially all the combined water is driven off from the aluminous material. Included in such group are the following materials, in which the partial analyses before and after calcination are given in per cent by weight:

|  | Before Calcination | | After Calcination, $Al_2O_3$ |
|---|---|---|---|
|  | $Al_2O_3$ | Combined $H_2O$ | |
| First grade diaspore, Mo | 72.4 | 13.5 | 84.5 |
| Dutch Guiana gibbsite | 58.4 | 30.6 | 84.0 |
| Pure bauxite | 73.9 | 26.1 | 100 |
| Bauxite, Ga | 54.0 | 16.1 | 64.5 |
| Second grade diaspore, Mo | 53.3 | 12.0 | 59.5 |

Also included within the term calcined aluminous materials is the product known as "activated alumina," a trade-marked substantially pure $Al_2O_3$ product of the Aluminum Ore Company which is made by the processes, involving calcining the aluminous material, disclosed in U. S. Patents Nos. 1,868,869 and 2,015,593.

Both finely divided calcined high-alumina clays of the recited type and "activated alumina" possess large adsorbing or occluding power for various liquids and gases, so that they are widely used for purifying various liquids and gases. Such adsorbing or occluding property of the above given calcined aluminous materials appears to depend upon a surface condition of the materials, probably produced by driving off the combined water therefrom, whereby a large surface receptive to the retention of liquids and gases is obtained in such materials. An important source of the HF containing calcined aluminous material employed as a constituent of the mix of this invention is the "spent" material which has been employed for removing HF in the process of HF alkylation of isoparaffins and olefins with anhydrous hydrofluoric acid as a catalyst. Such process, which is described in an article entitled "HF Alkylation" on page 153 of the "Oil and Gas Journal," March 30, 1946, requires that HF be removed from the bottoms obtained from the prefractionator. The calcined bauxite or "activated alumina" used for such purpose removes the last HF, which is normally combined with organic groups, from such bottoms, such removal apparently involving a process of adsorption or occlusion of HF by such materials. Such adsorption is highly preferential, so that only a small percentage of the organic material is adsorbed or occluded. "Activated alumina" has the property of being able to adsorb about 25% by weight of HF, whereas a calcined high-alumina clay such as calcined bauxite adsorbs about 15% by weight HF. When substantially complete saturation of such materials by HF occurs in the alkylation process, such materials are discarded, being then described as "spent." Whereas such materials, containing approximately the maximum possible amount of HF adsorbed or occluded therein, are ordinarily employed as addition agents in the concrete mixes of the present invention, such materials containing HF between the limits 1% by weight and the above maximum adsorptivity of each may be used in practicing the invention.

The spent HF containing calcined aluminous materials obtained from the above referred to alkylation process have been given by way of a specific source of the HF containing calcined aluminous material employed as an additive in the refractory concrete mix of the present invention. It is to be understood, however, that although such source is presently to be preferred, as it utilizes an otherwise waste material, the "HF containing calcined aluminous material" may be produced in other ways, as by contacting the above recited calcined aluminous materials directly with HF as a liquid or vapor to produce an HF content of from 1% up to the maximum possible adsorptivity of the material, if desired.

The refractory filler which may be used in the concrete mix is usually in the form of a refractory aggregate which may be fire clay grog, crushed firebrick, expanded shale, olivine, fused alumina, chrome, magnesite, vermiculite, diatomaceous earth, crushed red-brick and the like, or combinations of these materials depending upon the use to which the refractory concrete is to be put.

The constituents of the mix are supplied thereto in either comminuted or granular form to allow them to be uniformly distributed throughout the mix and consequently the resulting concrete. Those constituents which form the bond are preferably finely ground to facilitate their reaction. The calcium aluminate cement, for example, may be of such fineness that practially all particles will pass through a 100 mesh screen, and the HF containing calcined aluminous material may be ground to any particle size. The refractory filler or aggregate may be of any desired particle size or range of particle size consistent with substantial uniformity of distribution through the resulting concrete. The particle size of the aggregate naturally will be chosen with the minimum section of the shape or structure to be made in view.

The mix may conveniently be made by mixing the calcium aluminate cement, the HF containing calcined aluminous material, and the refractory filler, if used, in dry condition to a uniform color, the refractory aggregate being thoroughly wet down with water and then added to the mixture of the calcium aluminate cement and HF containing calcined aluminous material. Sufficient water is added to the resulting mixture to render it workable, the amount added depending upon the manner in which the mix is to be subsequently handled in the formation of the concrete shape or structure. Thus, if the concrete is to be cast into a mold or form, particularly if the shape is intricate, the mix should be of puddling consistency. For simple shapes so cast, less water may be used, whereas if the mix is to be tamped or vibrated into place or molded under pressure, still less water may be used. It is obvious that sufficient water should be used in all cases to develop fully the hydraulic strength of the cement and that an excess of water should be avoided. Besides the variation in modes of handling the mix above indicated, it is possible to deposit it in a mold or form or in any desired location, as for instance, in the applying of patches to existing structures, by charging the mix into a cement gun which pumps or otherwise forces it out through a discharge orifice.

After the mixture has been shaped or molded in any one of the ways above described, it is dried and then heated. Usually for bodies of large section, such as cast furnace walls, the practice follows approximately that employed in the drying and heating of newly constructed firebrick linings. The concrete may be air dried for a period of several days, after which the furnace is heated at temperatures which gradually increase up to operating temperature.

Small bodies and shapes, such as cast bricks, tiles, and slabs may be kept for a time, on the order of twenty-four hours in a high humidity-constant temperature atmosphere, dried at a low temperature, on the order of 230° F., and then subjected to a high temperature approximating that at which the shape will be used, for example, 2000° F.

Concrete resulting from mixes in accordance with the present invention, after having been dried and heated as above, possesses increased strength, improved load bearing characteristics at elevated temperatures, and greater abrasion resistance at elevated temperatures than similar concretes similarly treated, made in accordance with the prior art.

Such increased strength and load bearing qualities of the concrete of the present invention at room temperatures are shown by the results set out by the following Tables I and II giving the compressive strengths of 2 inch cubes made of mixtures containing the indicated percentages by weight of calcium aluminate cement, HF containing calcined aluminous material, and refractory aggregate. In the making of such 2 inch test cubes the mix was made of a puddling consistency and poured into 2 inch cube molds. After treatment in a moist cabinet the cubes were dried at 230° F., fired for the indicated length of time at the indicated temperature, and were then allowed to cool. After cooling, each cube was subjected to a compressive strength test at room temperature by subjecting it to gradually increasing pressure until a point of failure of the cube was reached.

In Table I, below, the mixes employed contained calcium aluminate cement, spent HF containing calcined bauxite, and crushed firebrick. The calcium aluminate cement in all tests was ground to a size such that 14.7% remained on a 325 mesh sieve. The HF containing calcined aluminous materials were, in the tests set out in both tables, ground to pass an 80 mesh sieve. The crushed firebrick, which ranged in particle size from 3/8 inch to dust, had the following specific screen analysis:

|  | 4 | 8 | 14 | 28 | 48 | 100 | Thru 100 |
|---|---|---|---|---|---|---|---|
| Crushed firebrick | 12.3 | 16.0 | 19.2 | 14.0 | 11.7 | 10.8 | 16.0 |

Each of the values given for each test in the following Tables I and II represents the average of tests on three similar 2 inch cubes. The figures under each heading in the tables represent the per cent of such material in the total batch by weight.

Table I

| | Calcium aluminate Cement | Crushed Firebrick | Spent Calcined Bauxite | Compressive Strength 4 Days Firing at— | |
|---|---|---|---|---|---|
| | | | | 1600° F. | 2000° F. |
| | Per cent | Per cent | Per cent | | |
| 1 | 20.7 | 79.3 | 0 | 1,157 | 708 |
| 2 | 19.6 | 75.4 | 5.0 | 821 | 2,971 |
| 3 | 18.7 | 71.9 | 9.4 | 1,138 | 3,239 |
| 4 | 17.8 | 68.7 | 13.4 | 3,283 | 3,296 |
| 5 | 17.1 | 65.8 | 17.1 | 3,271 | 4,783 |
| 6 | 17.1 | 65.8 | 17.1 | 3,866 | |

The HF containing calcined bauxite employed in tests 2 to 6, inclusive in Table I was that obtained as the spent catalyst removing agent in the alkylation process set out above, and therefore contained in the neighborhood of 15% by weight HF. The calcined bauxite employed in tests 2 to 5, inclusive, was submitted to a step of recalcining at 1000° F. to remove therefrom volatile material which otherwise would interfere with the set of the cement. Such volatile material, which appeared to be a minor percentage, is thought to be gasoline or a similar volatile organic material occurring in the bottoms in the alkylation process. The recalcination at a temperature of 1000° F. was high enough to drive off such organic material but not high enough to drive off more than perhaps a very small percentage of the HF. The spent HF containing calcined bauxite employed in test No. 6 in Table I was treated in an alternative manner to remove such volatile organic material. Such bauxite was submitted to a washing treatment, which consisted of immersing the bauxite in water for twenty-four hours after which it was dried at 230° F.

As seen from Table I, the addition of relatively small amounts of spent HF containing calcined bauxite markedly increased the compressive strengths of specimens fired for four days at 2000° F., such increased strength continuing upon increase of such bauxite content. With specimens fired for four days at 1600° F., however, the compressive strength is initially decreased and does not become approximately equal to that of a similar mix containing no admixture until 9.4% by weight of the mix of such bauxite is added. From this point, however, there is obtained a marked increase in compressive strength with such firing upon addition of larger amounts of such bauxite.

It will be seen from test No. 6 in Table I above that substantially the same beneficial results are obtained if the HF containing spent calcined bauxite is washed rather than recalcined to remove the volatile organic material. In this instance, at least, removal of such material appears to have been more complete than is obtained by recalcining, since the compressive strength of specimens fired for four days at 1600° F. is noticeably larger than the similar strength for those of the similar mix employed in test No. 5 in which the bauxite was recalcined.

The following Table II gives the results of compressive strength tests conducted on specimens composed of calcium aluminate cement, HF containing "activated alumina" and crushed firebrick, fired for twenty-four hours at 1600° F.

Table II

| | Calcium Aluminate Cement | Spent "activated alumina" | Crushed Firebrick | Compressive Strength,[1] Lbs. per Sq. Inch |
|---|---|---|---|---|
| | Per cent | Per cent | Per cent | |
| 1 | 20.7 | 0 | 79.3 | 813 |
| 2 | 17.1 | 17.1 | 65.8 | 3,423 |

[1] 24 Hrs. Firing at 1600° F.

The results set out in Table II demonstrate that increased compressive strengths are obtained when HF containing calcined aluminous material other than bauxite is employed in accordance with the invention. In this instance, the "activated alumina" was obtained as the spent HF removing material from the alkylation process and therefore contained in the neighborhood of 25% HF. Such material was neither recalcined nor washed before being incorporated in the mix of Table II.

Although the use of calcined aluminous material as the HF bearing agent in the mix and concrete employing calcium aluminate cement has been set out above by way of specific examples, it is to be understood that the invention is not limited thereto. As indicated earlier, the calcium aluminate itself may be the HF bearing agent in the mix, or, when fire clay grog is employed as the preponderant part of the refractory aggregate, it may be used as the agent bearing the amount of HF already defined. The HF may be incorporated in the calcium aluminate cement or the fire clay grog by subjecting such materials in a suitable HF resistant container to contact with liquid or gaseous HF. The structure of the calcium aluminate particles and those of the fire clay grog is such that HF within the limits of 1 to about 15% by weight may be thus incorporated in such materials, apparently by processes involving adsorption or occlusion.

The reason why refractory concretes containing calcium aluminate cement and refractory material, either of such components containing HF, in accordance with the present invention, possess increased hot and cold strength load-bearing qualities and abrasion resistance as compared to similar concretes without such HF bearing material is not fully understood. The theory which seems most fully to accord with the facts as now known is that the fluorine or HF released upon heating of the mix and consequently heating of the HF containing material reacts with the other components of the bond to promote the formation of mullite, $3Al_2O_3 \cdot 2SiO_2$ in fine crystalline form.

Regardless of the correctness of such theory, however, it is possible to employ the teaching of the present invention with concretes in which the HF containing material is not present in the mix, the concrete being subjected to the volatile products released by such HF containing material when heated to at least 1400° F. and preferably to at least 1600° F. in proximity to the concrete similarly heated. The various methods by which concrete may be subjected to volatile products of topaz have been set out in the above identified Kocher patent, and such methods may be practiced here in the same manner with the exception, however, that the concrete is treated with the volatile products from the HF containing material rather than those of topaz. Thus, the invention may be practiced especially with smaller shapes, such as bricks, slabs, and tiles, by heating such shapes in a muffle furnace with a quantity of HF containing refractory material, which may be among others the above defined calcined aluminous material, in a crucible, likewise placed in the muffle furnace. With larger shapes, such as furnace walls and the like, the furnace and other part may be heated preparatory to being placed in service and thereafter subjected to the action of an atmosphere of the volatile products of the HF containing refractory materials. Such improvement in strength in refractory concrete containing calcium aluminate cement and refractory aggregate within the limits noted may also be attained, after the concrete has been in service, by the diffusion into it at elevated temperatures of the volatile products given off by HF containing refractory material when heated to at least 1400° F., such heating of the body and the HF containing refractory material adjacent thereto, as stated, preferably being carried out at temperatures of at least 1600° F.

Whereas particular embodiments of the invention have been described above for purposes of illustration, it will be evident that numerous variations of details are possible within the teaching of the invention.

I claim:

1. A mix for making refractory concrete consisting of from 5 to 60% of calcium-aluminate cement and from 40 to 95% calcined clay containing from 50 to 99% alumina, one of said components containing from 1 to 25% hydrogen fluoride.

2. A mix for making refractory concrete consisting of from 5 to 60% of calcium-aluminate cement, from .5 to 95% calcined clay containing from 50 to 99% alumina and the balance substantially all refractory aggregate selected from the group consisting of fire-clay grog, crushed brick, expanded shale, olivine, fused alumina, chrome, magnesite, vermiculite and diatomaceous earth, one of said components cement, clay and aggregate, containing from 1 to 25% hydrogen fluoride.

3. A mix for making refractory concrete consisting of from 5 to 60% of calcium-aluminate cement and from 40 to 95% calcined bauxite containing from 1 to 25% hydrogen fluoride.

4. A mix for making refractory concrete consisting of from 5 to 60% of calcium-aluminate cement and from .5 to 95% calcined bauxite containing from 1 to 25% hydrogen fluoride.

5. Refractory concrete formed from a mix consisting of from 5 to 60% of calcium-aluminate cement and from 40 to 95% calcined clay containing from 50 to 99% alumina, one of said components containing from 1 to 25% hydrogen fluoride.

6. In a method of making refractory concrete, the steps including shaping a mix of calcium-aluminate cement and subjecting the shaped mass to contact with the gases evolved on heating to 1400° F. calcined clay containing from 50 to 99% alumina and from 1 to 25% hydrogen fluoride.

ROY T. GILES.

No references cited.